United States Patent
Yue et al.

(10) Patent No.: US 12,377,537 B2
(45) Date of Patent: Aug. 5, 2025

(54) MULTI-ARM SPACECRAFT MODEL PREDICTIVE CONTROL METHOD BASED ON MIXTURE OF GAUSSIAN PROCESSES, EQUIPMENT, AND MEDIUM

(71) Applicant: Harbin Institute of Technology, Shenzhen, Shenzhen (CN)

(72) Inventors: Chengfei Yue, Shenzhen (CN); Xibin Cao, Harbin (CN); Ziran Liu, Harbin (CN); Xueqin Chen, Harbin (CN); Fan Wu, Harbin (CN); Cheng Wei, Harbin (CN)

(73) Assignee: Harbin Institute of Technology, Shenzhen, Shenzhen (CN)

( * ) Notice: Subject to any disclaimer, the term of this patent is extended or adjusted under 35 U.S.C. 154(b) by 241 days.

(21) Appl. No.: 18/143,795

(22) Filed: May 5, 2023

(65) Prior Publication Data
US 2023/0381956 A1 Nov. 30, 2023

(30) Foreign Application Priority Data
May 26, 2022 (CN) .......................... 202210582234.6

(51) Int. Cl.
*B25J 9/16* (2006.01)
*B64G 4/00* (2006.01)
(Continued)

(52) U.S. Cl.
CPC .............. *B25J 9/163* (2013.01); *G06F 17/16* (2013.01); *G06F 17/18* (2013.01); *B64G 2004/005* (2013.01); *G05B 13/048* (2013.01)

(58) Field of Classification Search
CPC ........ B64G 1/242; B64G 1/244; B64G 1/646; B64G 1/1078; B64G 1/1081; B64G 1/245;
(Continued)

(56) References Cited

U.S. PATENT DOCUMENTS

| | | | |
|---|---|---|---|
| 11,951,630 B2 * | 4/2024 | Khatib ................. | B25J 9/1689 |
| 2021/0002005 A1 * | 1/2021 | Weiss .................... | B64G 1/242 |
| 2023/0119664 A1 * | 4/2023 | Chakrabarty ........ | G05B 13/027 |
| | | | 700/28 |

OTHER PUBLICATIONS

Sirois, Nonlinear MPC for FreeFlying Space Manipulator, Tesi Di Laurea Magistrale in Automation and Control Engineering Ingegneria Dell'Automazione (Year: 2021).*

* cited by examiner

*Primary Examiner* — Ryan Rink
(74) *Attorney, Agent, or Firm* — IPRO, PLLC (57) ABSTRACT

The present disclosure provides a multi-arm spacecraft model predictive control method based on the mixture of Gaussian processes, equipment, and a medium. Model predictive control has excellent performance in dealing with complex nonlinear systems such as multi-arm spacecrafts with various constraints, and is widely applied to ground robots, unmanned aerial vehicles, autonomous driving and other practical scenarios. Therefore, a task space controller is designed based on the model predictive control in the present disclosure. Besides, in order to enhance the anti-interference capability of the present disclosure, an interference model is established and compensation is carried out in the model predictive control by utilizing the characteristics of small training data volume and high training speed in the mixture of Gaussian processes. Finally, a thrust distribution method is designed to complete platform control. The method provided by the present disclosure is convenient and intuitive in design and has relatively high practicability.

10 Claims, 1 Drawing Sheet

(51) Int. Cl.
*G06F 17/16* (2006.01)
*G06F 17/18* (2006.01)
*G05B 13/04* (2006.01)

(58) Field of Classification Search
CPC . B64G 1/262; B64G 1/36; B64G 1/40; B64G 1/2422; B64G 2004/005; G05B 13/048; G05B 13/041; B25J 9/163; B25J 9/1682
See application file for complete search history.

MULTI-ARM SPACECRAFT MODEL PREDICTIVE CONTROL METHOD BASED ON MIXTURE OF GAUSSIAN PROCESSES, EQUIPMENT, AND MEDIUM

TECHNICAL FIELD

The present disclosure belongs to the technical fields of on-orbit services, spacecraft control, and model predictive control, and in particular relates to a multi-arm spacecraft model predictive control method based on the mixture of Gaussian processes, equipment, and a medium.

BACKGROUND OF THE PRESENT DISCLOSURE

In recent years, an on-orbit service technology has received widespread attention from countries around the world. Major space agencies such as China, the United States, ESA, and Japan have conducted a large number of ground and space experiments, achieving various types of on-orbit service tasks such as satellite capture, refueling, component replacement, and space debris cleanup. However, the spacecraft on-orbit service tasks are all described in a task/Cartesian space, while the traditional controller design is mostly expressed in a joint space, which requires additional inverse kinematics solution, so that besides the lack of intuitiveness, there are problems such as mismatch of control ability and large amount of calculation. Therefore, the present disclosure proposes a task space controller design method based on model predictive control (MPC), which is simple, direct, and suitable for processing high-dimensional nonlinear models of a multi-arm spacecraft.

Furthermore, there are various disturbances in the process of conducting experiments on the ground and executing tasks in space for an on-orbit service spacecraft, including parameter uncertainty, spatial and environmental torque disturbances, and input and measurement noise, which have a significant impact on the performance of on-orbit service tasks. Traditional solutions have their own advantages and disadvantages: the method based on a robust design needs to assume that the total disturbance has an upper bound; the method based on an adaptive disturbance observer is capable of estimating disturbances online, but it has higher requirements for initial values and is poor in performance at initial moments; and the method for constructing disturbance models based on neural networks and fuzzy networks requires offline training and is better in initial performance, but it requires a large amount of training data. Considering the actual workflow of the on-orbit service spacecraft, it is promising to design an off-line disturbance model construction method with small data demand and fast training speed by using the Mixture of Gaussian Processes (MGP).

Finally, the traditional on-orbit service spacecrafts are generally in a free-floating mode, which do not control the satellite platform, or only rely on flywheels for platform attitude adjustment, resulting in weak maneuverability and limited operating range, which affects the efficiency and performance of on-orbit services. Aiming at this problem, the present disclosure employs jet thrusters to adjust the spacecraft platform pose and designs a corresponding thruster control distribution method.

SUMMARY OF THE PRESENT DISCLOSURE

The purpose of the present disclosure is to propose a multi-arm spacecraft model predictive control method based on the mixture of Gaussian processes, equipment and a medium for the deficiencies of the existing multi-arm spacecraft control methods.

The present disclosure is realized by the following technical solution, and the present disclosure proposes a multi-arm spacecraft model predictive control method based on the mixture of Gaussian processes, which specifically includes:

establishing dynamic and kinematic models of a multi-arm spacecraft as a prediction model in MPC;

for an estimated value $\hat{d}$ of a disturbance term in the prediction model, inputting initial excitation to establish a data set, and employing the mixture of Gaussian processes for training to obtain residual dynamics of the multi-arm spacecraft as the estimated value of the disturbance term;

according to actual drive input saturation constraints, constructing a model predictive controller to implement the tracking of a desired trajectory for end poses and platform pose of multi-arm spacecraft manipulators, where the saturation includes saturation of joint motors and thrust saturation of platform thrusters are considered; and setting the platform thrusters to be in an on-off control mode, and assigning a platform continuous control instruction generated by the MPC as start-up time of each of the thrusters to obtain a final thruster driving instruction.

Further, for a multi-arm spacecraft with n manipulators, each of which has m degrees of freedom, and with a platform equipped with l jet thrusters, the dynamic model of the multi-arm spacecraft is first described in a joint space:

the dynamic model of the multi-arm spacecraft is expressed as:

$$M\ddot{Q}+C+d=u \qquad (1)$$

where M represents an inertial parameter of the multi-arm spacecraft; C represents a nonlinear term; d is the disturbance term; $Q=[r_0^T, q^T]^T$ represents information about the platform pose and joint angle, $r_0$ is the 6-degree-of-freedom platform pose, and $q=[q_1, \ldots, q_n]^T$ is the joint angle; and $u=[F_0^T, F_q^T]^T$ represents a control force and a control torque, $F_0$ represents a platform control force/torque, and $F_q$ represents a joint torque.

Further, based on a mapping relationship between the end-effectors of the manipulators and the states of joints and a platform, the description of the end-effector poses of the on-orbit service spacecraft is obtained by using a DH parameter method:

$$\begin{bmatrix} r_0 \\ r_{e1} \\ \vdots \\ r_{en} \end{bmatrix} = \begin{bmatrix} r_0 \\ {}^1T_0^1 \, {}^1T_1^2 \ldots {}^1T_{m-1}^m \\ \vdots \\ {}^nT_0^1 \, {}^nT_1^2 \ldots {}^nT_{m-1}^m \end{bmatrix} = g(Q) \qquad (2)$$

where a homogeneous transformation matrix ${}^nT_{m-1}^m$ is defined based on DH parameters $\theta_m, d_m, a_m, \alpha_m$:

$$^nT_{m-1}^m = \begin{bmatrix} \cos\theta_m & -\sin\theta_m & 0 & a_m \\ \sin\theta_m \cos\alpha_m & \cos\theta_m \cos\alpha_m & -\sin\alpha_m & -d_i \sin\alpha_m \\ \sin\theta_m \sin\alpha_m & \cos\theta_m \sin\alpha_m & \cos\alpha_m & d_i \cos\alpha_m \\ 0 & 0 & 0 & 1 \end{bmatrix} \qquad (3)$$

finally, a state space expression is built:

$$\begin{cases} \dot{X} = f(X, u) = \begin{bmatrix} \dot{Q} \\ M^{-1}(\tau - C - \hat{d}) \end{bmatrix} \\ \xi = g(Q) \end{cases} \quad (4)$$

where $X=[Q^T, \dot{Q}^T]^T$, $\xi=[r_0^T, r_{el}^T, \ldots, r_{en}^T]^T$ represents the platform pose and the end-effector poses of the manipulators, and $\hat{d}$ represents the estimated value of the disturbance term; and sampling time $\Delta t$ is set, the continuous state space expression is converted into a discrete time model, and system states at a future moment k+N are predicted based on a value measured at a current moment k:

$$\begin{cases} X_{k+1} = X_k + \Delta t \cdot f(X_k, u_k) \\ \xi_k = g(Q_k) \end{cases} \quad (5)$$

Further, the recorded p groups of data sets are used for training of the mixture of Gaussian processes, where an input x contains the multi-arm spacecraft pose Q, speed $\dot{Q}$, and the increment $\Delta u$ of a control variable, and an output y is a difference value between an actual angular velocity and an angular acceleration calculated by a nominal model, that is, the residual dynamics, which is used to capture the impact $\hat{d}$ of the total disturbance on the system;

the Gaussian processes assume in advance that samples obey a Gaussian distribution:

$$y(x) \sim N(\mu(x), k(x,x')) \quad (6)$$

where $\mu(x)$ represents a mean function; $k(x, x')$ represents a covariance function, and an expression thereof is as follows:

$$k(x, x') = \sigma_f^2 \exp\left[\frac{-(x-x')^2}{2l^2}\right] + \sigma_n^2 \delta(x-x') \quad (7)$$

where $\sigma_n$ is equal to 0.3, $\sigma_f$ and l are hyperparameters to be solved, and $$\delta(x-x') = \begin{cases} 1, & x = x' \\ 0, & x \neq x' \end{cases};$$

the covariance function is solved by using an optimal maximum likelihood estimation method:

$$\max_{\sigma_f, l} \log(y|x) = -\frac{1}{2}y^T K^{-1} y - \frac{1}{2} \log|K| - \frac{n}{2} \log(2\pi) \quad (8)$$

after the hyperparameters of the Gaussian processes are obtained via training, the corresponding output value $y_*$ can be solved by using the input information $x_*$ of a prediction point; a joint probability density function of the samples and a test set is firstly determined:

$$\begin{bmatrix} y(x) \\ y_* \end{bmatrix} \sim N\left(0, \begin{bmatrix} K & K_*^T \\ K_* & K_{**} \end{bmatrix}\right) \quad (9)$$

where $$K_{**} = k(x_*, x_*) \quad (10)$$

$$K_* = [k(x_*, x_1) \; k(x_*, x_2) \; \ldots \; k(x_*, x_p)] \quad (11)$$

$$K = \begin{bmatrix} k(x_1, x_1) & k(x_1, x_2) & \ldots & k(x_1, x_p) \\ k(x_2, x_1) & k(x_2, x_2) & \ldots & k(x_2, x_p) \\ \vdots & \vdots & \ddots & \vdots \\ k(x_p, x_1) & k(x_p, x_2) & \ldots & k(x_p, x_p) \end{bmatrix} \quad (12)$$

a posterior probability expression of the prediction point is obtained based on Bayesian reasoning:

$$y_*|y(x) \sim N(K_* K^{-1} y, K_{**} - K_* K^{-1} K_*^T) \quad (13)$$

a predicted value of the Gaussian processes is accordingly obtained:

$$\bar{y}_* = K_* K^{-1} y \quad (14).$$

Further, a local Gaussian process method is utilized in the Gaussian processes of the multi-arm spacecraft. The local Gaussian process method includes: clustering based on a Gaussian mixture model method, performing regression on each of Gaussian components, and finally fusing local predicted values during prediction;

assuming that the input x obeys the mixture distribution of the M Gaussian components, a probability density distribution function of the input x is as follows:

$$p(x|\Theta) = \sum_{i=1}^{M} \pi_i p\left(x|\mu_i, \Sigma_i\right) \quad (15)$$

where $\pi_i$ is a mixing coefficient, which represents the probability that the sample comes from the $i^{th}$ Gaussian component; $p(x|\mu_i, \Sigma_i)$ represents the probability that the sample is generated by the $i^{th}$ Gaussian component; and $\{\mu_i, \Sigma_i\}$ is the hyperparameter of the mixture of Gaussian processes.

Further, after the training samples are obtained, the model parameters are first initialized, and then the model parameters are updated by means of the continuous iteration of steps E and M of expectation-maximization until the model converges, where step E uses the parameters $\{\pi_i, \mu_i, \Sigma_i\}$ estimated in step M to calculate a posterior probability $r_i$ of the sample coming from the $i^{th}$ Gaussian component:

$$r_i = \frac{\pi_i p\left(x|\mu_i, \Sigma_i\right)}{\sum_{j=1}^{M} \pi_j p\left(x|\mu_j, \Sigma_j\right)} \quad (16)$$

in step M, the posterior probability $r_i$ of the training samples is calculated through step E, and the model parameters are updated by maximizing a logarithmic likelihood function:

$$\begin{cases} \mu_i = \sum_{k=1}^{n} r_k x_k / \sum_{k=1}^{n} r_k \\ \Sigma_i = \sum_{k=1}^{n} r_k (x_k - \mu_i)(x_k - \mu_i)^T / \sum_{k=1}^{n} r_k \\ \pi_i = \frac{1}{n} \sum_{k=1}^{n} r_k \end{cases} \quad (17)$$

for each group of Gaussian components obtained by clustering, a Gaussian regression training method is used to obtain the corresponding Gaussian process models and the predicted value $y_{*i}$ of the prediction point $x_*$ under the M local Gaussian process models, and the prediction point generated by the clustering is subjected to weighted fusion by the posterior probability $r_{*i}$ generated by the $i^{th}$ Gaussian component so as to calculate the final predicted value $y_*$:

$$y_* = \sum_{i=1}^{M} r_{*i} y_{*i}. \tag{18}$$

Further, a performance index in the following form is constructed to solve the control input of the system:

$$\min_{u} \ J = \frac{1}{2}\sum_{i=1}^{N} \left\|\xi_{k+i} - \xi_{k+i}^{d}\right\|_{Q_t}^{2} + \|u_{k+i-1}\|_{Q_r}^{2} \tag{19}$$

s.t. $X_{k+1} = X_k + \Delta t \cdot f(X_k, u_k)$ $\xi_k = g(Q_k)$ $X_{min} < X_k < X_{max}$ $\xi_{min} < \xi_k < \xi_{max}$ $u_{min} < u_k < u_{max}$ where $Q_r$ and $Q_t$ represent weighting matrices of a control error and an input penalty term, respectively; and
  by selecting appropriate controller parameters which include $\Delta t$, N, $Q_r$ and $Q_t$, the above optimization control problem is solved, the control variable $U=[u_k, u_{k+1}, \ldots, u_{k+N-1}]^T$ at the next N moments is obtained, and only the control variable $u_k$ at the moment k is used as the system input.

Further, a generalized thruster installation matrix is given firstly, that is, there are l jet thrusters installed on the satellite platform, where the installation position of each of the thrusters is divided into $[x_{Ti}, y_{Ti}, z_{Ti}]^T$, and the included angles between thrust vectoring and a +x direction and between the thrust vectoring and a x-y plane are respectively $\beta_i$ and $\gamma_i$ so that a configuration matrix of a thruster thrust and a torque under the satellite platform system is obtained:

$$A(:,i) = \begin{bmatrix} \cos\gamma_i \cos\beta_i \\ \cos\gamma_i \sin\beta_i \\ \sin\gamma_i \\ \cos\gamma_i \sin\beta_i \cdot z_{Ti} - \sin\gamma_i \cdot y_{Ti} \\ \sin\gamma_i \cdot x_{Ti} - \cos\gamma_i \cos\beta_i \cdot z_{Ti} \\ \cos\gamma_i \cos\beta_i \cdot y_{Ti} - \cos\gamma_i \sin\beta_i \cdot x_{Ti} \end{bmatrix} \tag{20}$$

thus, a relationship between the platform control force and the control torque as well as thrust of the jet thrusters is obtained:

$$F_0 = C_{IB} A T \tag{21}$$

where $C_{IB}$ is a conversion matrix from the platform system to an inertial system, and $T=[T_1, T_2, \ldots, T_l]^T$ is the thrust of the jet thrusters;
  for the obtained platform control variable $F_0$, a thrust distribution algorithm is designed by constructing the following optimization problems, and the control variable is allocated to each of the thrusters:

$$\min_{T} \ J = \frac{1}{2}\left[\|C_{IB} A T - \tau\|_{Qt}^{2} + \|T\|_{Rt}^{2}\right] \tag{22}$$

s.t. $T_{lb} \leq T \leq T_{ub}$ where $T_{lb}$ and $T_{ub}$ represent thrust saturation constraints for the thrusters;
  the continuous thrust of each of the thrusters is obtained by thrust distribution; in order to meet the on-off control mode of the thrusters, the continuous thrust is converted into the start-up time in an on-off mode through a PWM method:

$$t_{on}^{i} = \frac{T_i^*}{T_i^o} \Delta t \tag{23}$$

where $T_i^*$ represents the continuous thrust obtained by the distribution algorithm, $T_i^o$ represents the start-up thrust of the thrusters, and $\Delta t$ represents a PWM frequency; and
  finally, minimum start-up time $\Delta t_c$ of the thrusters is taken into account, and the final thruster driving instruction is obtained:

$$T_{on}^{i} = \begin{cases} 1, & \text{if } 0 \leq t \leq t_{on}^{i} \text{ and } t_{on}^{i} \geq \Delta t_c \\ 0, & \text{otherwise} \end{cases} \tag{24}$$

The present disclosure provides electronic equipment, including a memory and a processor, where the memory stores a computer program, and the processor implements the steps of the multi-arm spacecraft model predictive control method based on the mixture of Gaussian processes when executing the computer program.

The present disclosure provides a computer-readable storage medium for storing computer instructions, where the steps of the multi-arm spacecraft model predictive control method based on the mixture of Gaussian processes are implemented when the computer instructions are executed by the processor.

The present disclosure has the following beneficial effects.
  (1) The present disclosure realizes the tracking control capability in an on-orbit service spacecraft task space. Under a framework of model predictive control, by considering various interference factors and actuator saturation constraints in the actual operating environment, the tracking of the desired trajectory by the end-effector poses of the multi-arm spacecraft manipulators and the platform pose is implemented, and the design method is intuitive and simple, so that the present disclosure is suitable for the actual engineering scene.
  (2) For the disturbance term in the prediction model, the Gaussian processes are designed for estimation compensation to reduce the requirement of offline training for the amount of data while improving the predictive control performance of the model in the presence of various disturbances. In addition, the Gaussian mixture model is used for clustering before training so as to further accelerate training speed, so that the present disclosure is more practical.
  (3) Considering the maneuverability requirements of the on-orbit service spacecraft during the execution of tasks, the jet thrusters are used to control the platform pose; and since the saturation and dead zone characteristics of the thrusters are taken into account, the continuous control instruction generated by the MPC is assigned as the start-up time of each of the thrusters, thus achieving the flexibility and mobility of the spacecraft platform.

DETAILED DESCRIPTION OF THE PRESENT DISCLOSURE

The technical solutions in the examples of the present disclosure will be clearly and completely described below in conjunction with the accompanying drawings in the examples of the present disclosure. Apparently, the described examples are only a part rather than all of the examples of the present disclosure. Based on the examples of the present disclosure, all other examples obtained by those of ordinary skill in the art without making creative efforts shall fall within the protection scope of the present disclosure.

Aiming at the deficiencies of the existing multi-arm on-orbit service spacecraft control methods, the present disclosure proposes a multi-arm spacecraft task space control method based on the mixture of Gaussian processes and model predictive control (MGP-MPC). The model predictive control has excellent performance in dealing with complex nonlinear systems such as multi-arm spacecrafts with various constraints, and is widely applied to ground robots, unmanned aerial vehicles, autonomous driving and other practical scenarios. Therefore, a task space controller is designed based on the model predictive control. Besides, in order to enhance the anti-interference capability of the present disclosure, an interference model is established and compensation is carried out in the model predictive control by utilizing the characteristics of small training data volume and high training speed in the mixture of Gaussian processes. Finally, a thrust distribution method is designed to complete platform control. The method provided by the present disclosure is convenient and intuitive in design and has relatively high practicability.

Figure 1:
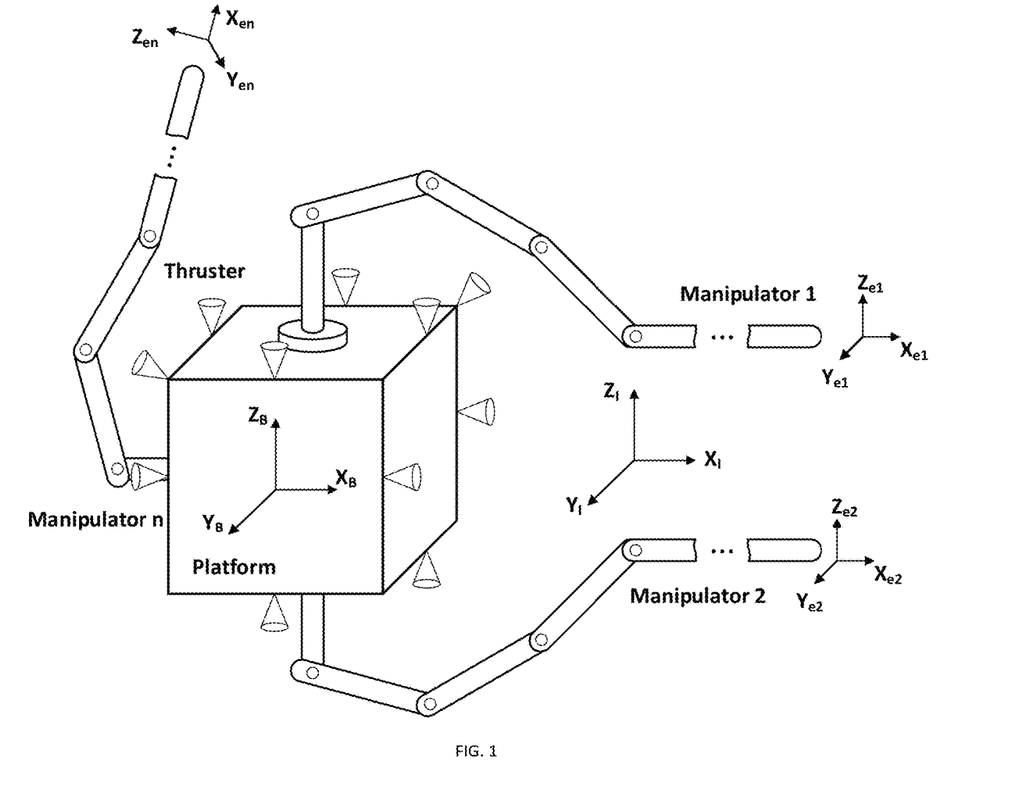
FIG. 1 is a schematic diagram of a multi-arm spacecraft; and in the figure, the multi-arm spacecraft has n manipulators, each of which has m degrees of freedom, and has a platform equipped with l jet thrusters, where ΣB is a platform system, ΣI is an inertial system, and Σen is a end-effector coordinate system of the $n^{th}$ manipulator.
Figure 2:
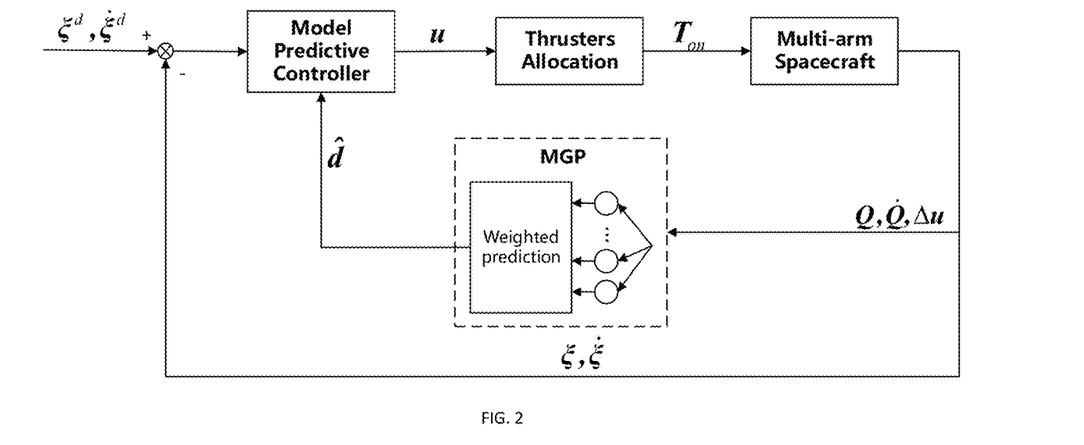
FIG. 2 is a control flow chart of a multi-arm spacecraft task space control method based on the mixture of Gaussian processes and model predictive control.

Referring to FIG. 1 and FIG. 2, the present disclosure proposes a multi-arm spacecraft model predictive control method based on the mixture of Gaussian processes, which specifically includes:

(1) establishing dynamic and kinematic models of a multi-arm spacecraft as a prediction model in Model Predictive Control (MPC), where for a multi-arm spacecraft with n manipulators, each of which has m degrees of freedom, and with a platform equipped with l jet thrusters, the dynamic model of the multi-arm spacecraft is first described in a joint space:

the dynamic model of the multi-arm spacecraft is expressed as:

$$M\ddot{Q}+C+d=u \qquad (1)$$

where M represents an inertial parameter of the multi-arm spacecraft; C represents a nonlinear term; d is the disturbance term; $Q=[r_0^T, q^T]^T$ represents information about the platform pose and joint angle, $r_0$ is the 6-degree-of-freedom platform pose, and $q=[q_1, \ldots q_n]^T$ is the joint angle; and $u=[F_0^T, F_q^T]^T$ represents a control force and a control torque, $F_0$ represents a platform control force/torque, and $F_q$ represents a joint torque.

Based on a mapping relationship between the end-effectors of the manipulators and the states of joints and a platform, the description form of the end-effectors poses of the multi-arm spacecraft is obtained by using an improved DH parameter method:

$$\begin{bmatrix} r_0 \\ r_{e1} \\ \vdots \\ r_{en} \end{bmatrix} = \begin{bmatrix} r_0 \\ {}^1T_0^{11}T_1^2 \ldots {}^1T_{m-1}^m \\ \vdots \\ {}^nT_0^{1n}T_1^2 \ldots {}^nT_{m-1}^m \end{bmatrix} = g(Q) \qquad (2)$$

where a homogeneous transformation matrix ${}^nT_{m-1}^m$ is defined based on DH parameters $\theta_m, d_m, a_m, \alpha_m$:

$$^nT_{m-1}^m = \begin{bmatrix} \cos\theta_m & -\sin\theta_m & 0 & a_m \\ \sin\theta_m\cos\alpha_m & \cos\theta_m\cos\alpha_m & -\sin\alpha_m & -d_i\sin\alpha_m \\ \sin\theta_m\sin\alpha_m & \cos\theta_m\sin\alpha_m & \cos\alpha_m & d_i\cos\alpha_m \\ 0 & 0 & 0 & 1 \end{bmatrix} \qquad (3)$$

finally, a state space expression is built:

$$\begin{cases} \dot{X} = f(X, u) = \begin{bmatrix} \dot{Q} \\ M^{-1}(\tau - C - \hat{d}) \end{bmatrix} \\ \xi = g(Q) \end{cases} \qquad (4)$$

where $X=[Q^T, \dot{Q}^T]^T$, $\xi=[r_0^T, r_{e1}^T, \ldots, r_{en}^T]^T$ represents the platform pose and the end-effectors poses of the manipulators, and $\hat{d}$ represents the estimated value of the disturbance term; and sampling time $\Delta t$ is set, the continuous state space expression is converted into a discrete time model, and a system state at a future moment k+N is predicted based on a value measured at a current moment k:

$$\begin{cases} X_{k+1} = X_k + \Delta t \cdot f(X_k, u_k) \\ \xi_k = g(Q_k) \end{cases} \qquad (5)$$

(2) For an estimated value $\hat{d}$ of a disturbance term in the prediction model, inputting initial excitation to establish a data set, and employing the mixture of Gaussian processes for training to obtain residual dynamics of the multi-arm spacecraft as the estimated value of the disturbance term, where the recorded p groups of data sets are first used for training of the mixture of Gaussian processes, where an input x contains the multi-arm spacecraft pose Q, speed $\dot{Q}$, and the increment $\Delta u$ of a control variable, and an output y is a difference value between an actual angular velocity and an angular acceleration calculated by a nominal model (that is, without the disturbance term), that is, the residual dynamics, which is used to capture the impact $\hat{d}$ of the total disturbance on the system;

the Gaussian processes assume in advance that samples obey a Gaussian distribution:

$$y(x) \sim N(\mu(x), k(x,x')) \tag{6}$$

where $\mu(x)$ represents a mean function; $k(x, x')$ represents a covariance function, which has more forms and is generally a Gaussian kernel function, and an expression thereof is as follows:

$$k(x, x') = \sigma_f^2 \exp\left[\frac{-(x-x')^2}{2l^2}\right] + \sigma_n^2 \delta(x - x') \tag{7}$$

where $\sigma_n$ is equal to 0.3, $\sigma_f$ and l are hyperparameters to be solved, and $$\delta(x - x') = \begin{cases} 1, & x = x' \\ 0, & x \neq x' \end{cases};$$

and
therefore, the Gaussian processes are actually processes of solving the hyperparameters in the covariance function through sample data. The present disclosure adopts an optimal maximum likelihood estimation method to solve the covariance function:

$$\max_{\sigma_f, l} \log(y \mid x) = -\frac{1}{2} y^T K^{-1} y - \frac{1}{2} \log|K| - \frac{n}{2} \log(2\pi) \tag{8}$$

after the hyperparameters of the Gaussian processes are obtained via training, the corresponding output value y, can be solved by using the input information x, of a prediction point; a joint probability density function of the samples and a test set is firstly determined:

$$\begin{bmatrix} y(x) \\ y_* \end{bmatrix} \sim N\left(0, \begin{bmatrix} K & K_*^T \\ K_* & K_{**} \end{bmatrix}\right) \tag{9}$$

where $$K_{**} = k(x_*, x_*) \tag{10}$$

$$K_* = [k(x_*, x_1) \; k(x_*, x_2) \; \ldots \; k(x_*, x_p)] \tag{11}$$

$$K = \begin{bmatrix} k(x_1, x_1) & k(x_1, x_2) & \ldots & k(x_1, x_p) \\ k(x_2, x_1) & k(x_2, x_2) & \ldots & k(x_2, x_p) \\ \vdots & \vdots & \ddots & \vdots \\ k(x_p, x_1) & k(x_p, x_2) & \ldots & k(x_p, x_p) \end{bmatrix} \tag{12}$$

a posterior probability expression of the prediction point is obtained based on Bayesian reasoning:

$$y_* | y(x) \sim N(K_* K^{-1} y, K_{**} - K_* K^{-1} K_*^T) \tag{13}$$

a predicted value of the Gaussian processes is accordingly obtained:

$$\bar{y}_* = K_* K^{-1} y \tag{14}.$$

On the basis of the above-mentioned Gaussian processes of the multi-arm spacecraft, in order to speed up training and predicting, the present disclosure utilizes a local Gaussian process method in the Gaussian processes of the multi-arm spacecraft. The local Gaussian process method includes: clustering based on a Gaussian mixture model method, performing regression on each of Gaussian components, and finally fusing local predicted values during prediction;

assuming that the input x obeys the mixture distribution of the M Gaussian components, a probability density distribution function of the input x is as follows:

$$p(x \mid \Theta) = \sum_{i=1}^{M} \pi_i \, p\!\left(x \mid \mu_i, \sum_i\right) \tag{15}$$

where $\pi_i$ is a mixing coefficient, which represents the probability that the sample comes from the $i^{th}$ Gaussian component; $p(x|\mu_i, \Sigma_i)$ represents the probability that the sample is generated by the $i^{th}$ Gaussian component; and $\{\mu_i, \Sigma_i\}$ is the hyperparameter of the mixture of Gaussian processes.

EM (Expectation-Maximization) is an effective algorithm for learning mixture models, which is theoretically equivalent to a maximum likelihood estimation method. After the training samples are obtained, the model parameters are first initialized, and then the model parameters are updated by means of the continuous iteration of steps E and M of expectation-maximizationuntil the model converges,
where step E uses the parameters $\{\pi_i, \mu_i, \Sigma_i\}$ estimated in step M to calculate a posterior probability $r_i$ of the sample coming from the $i^{th}$ Gaussian component:

$$r_i = \frac{\pi_i p\!\left(x \mid \mu_i, \sum_i\right)}{\sum_{j=1}^{M} \pi_j \, p\!\left(x \mid \mu_j, \sum_j\right)} \tag{16}$$

in step M, the posterior probability $r_i$ of the training samples is calculated through step E, and the model parameters are updated by maximizing a logarithmic likelihood function:

$$\begin{cases} \mu_i = \sum_{k=1}^{n} r_k x_k \Big/ \sum_{k=1}^{n} r_k \\ \sum_i = \sum_{k=1}^{n} r_k (x_k - \mu_i)(x_k - \mu_i)^T \Big/ \sum_{k=1}^{n} r_k \\ \pi_i = \frac{1}{n} \sum_{k=1}^{n} r_k \end{cases} \tag{17}$$

for each group of Gaussian components obtained by clustering, a Gaussian regression training method is used to obtain the corresponding Gaussian process models and the predicted value $y_{*i}$ of the prediction point $x_*$ under the M local Gaussian process models, and the prediction point generated by the clustering is subjected to weighted fusion by the posterior probability $r_{*i}$ generated by the $i^{th}$ Gaussian component so as to calculate the final predicted value $y_*$:

$$y_* = \sum_{i=1}^{M} r_{*i} y_{*i}. \tag{18}$$

(3) Constructing, according to actual drive input saturation constraints, a model predictive controller to implement the tracking of a desired trajectory by end-effectors poses of multi-arm spacecraft manipulators and a platform pose, where the saturation includes saturation of joint motors and thrust saturation of platform thrusters, in order to reduce the energy consumption as much as possible while realizing the task space trajectory tracking of the on-orbit service spacecraft, a performance index in the following form is constructed to solve the control input of the system:

$$\min_u \quad J = \frac{1}{2}\sum_{i=1}^{N}\|\xi_{k+i} - \xi_{k+i}^d\|_{Q_t}^2 + \|u_{k+i-1}\|_{Q_r}^2 \qquad (19)$$

$$\text{s.t.} \quad X_{k+1} = X_k + \Delta t \cdot f(X_k, u_k)$$

$$\xi_k = g(Q_k)$$

$$X_{min} < X_k < X_{max}$$

$$\xi_{min} < \xi_k < \xi_{max}$$

$$u_{min} < u_k < u_{max}$$

where $Q_r$ and $Q_t$ represent weighting matrices of a control error and an input penalty term, respectively; and by selecting appropriate controller parameters which include $\Delta t$, N, $Q_r$ and $Q_t$, the above optimization control problem is solved, the control variable U=[$u_k$, $u_{k+1}$, ..., $u_{k+N-1}$]$^T$ at the next N moments is obtained, and only the control variable $u_k$ at the moment k is used as the system input.

(4) Setting the platform thrusters to be in an on-off control mode, and assigning a platform continuous control instruction generated by the MPC as start-up time of each of the thrusters to obtain a final thruster driving instruction.

A generalized thruster installation matrix is given first, that is, there are l jet thrusters installed on the satellite platform, where the installation position of each of the thrusters is divided into [$x_{Ti}$, $y_{Ti}$, $z_{Ti}$]$^T$, and the included angles between thrust vectoring and a +x direction and between the thrust vectoring and a x-y plane are respectively $\beta_i$ and $\gamma_i$ so that a configuration matrix of a thruster thrust and a torque under the satellite platform system is obtained:

$$A(:,i) = \begin{bmatrix} \cos\gamma_i \cos\beta_i \\ \cos\gamma_i \sin\beta_i \\ \sin\gamma_i \\ \cos\gamma_i \sin\beta_i \cdot z_{Ti} - \sin\gamma_i \cdot y_{Ti} \\ \sin\gamma_i \cdot x_{Ti} - \cos\gamma_i \cos\beta_i \cdot z_{Ti} \\ \cos\gamma_i \cos\beta_i \cdot y_{Ti} - \cos\gamma_i \sin\beta_i \cdot x_{Ti} \end{bmatrix} \qquad (20)$$

thus, a relationship between the platform control force and the control torque as well as thrust of the jet thrusters is obtained:

$$F_0 = C_{IB} A T \qquad (21)$$

where $C_{IB}$ is a conversion matrix from the platform system to an inertial system, and T=[$T_1$, $T_2$, ..., $T_l$]$^T$ is the thrust of the jet thrusters;

for the obtained platform control variable $F_0$, a thrust distribution algorithm is designed by constructing the following optimization problems, and the control variable is allocated to each of the thrusters:

$$\min_T \quad J = \frac{1}{2}\left[\|C_{IB}AT - \tau\|_{Q_t}^2 + \|T\|_{R_t}^2\right] \qquad (22)$$

$$\text{s.t.} \quad T_{lb} \leq T \leq T_{ub}$$

where $T_{lb}$ and $T_{ub}$ represent thrust saturation constraints for the thrusters;

the continuous thrust of each of the thrusters is obtained by thrust distribution; in order to meet the on-off control mode of the thrusters, the continuous thrust is converted into the start-up time in an on-off mode through a PWM method:

$$t_{on}^i = \frac{T_i^*}{T_i^o}\Delta t \qquad (23)$$

where $T_i^*$ represents the continuous thrust obtained by the distribution algorithm, $T_i^o$ represents the start-up thrust of the thrusters, and $\Delta t$ represents a PWM frequency; and finally, minimum start-up time $\Delta t_c$ of the thrusters is taken into account, and the final thruster driving instruction is obtained:

$$T_{on}^i = \begin{cases} 1, & \text{if } 0 \leq t \leq t_{on}^i \text{ and } t_{on}^i \geq \Delta t_c \\ 0, & \text{otherwise} \end{cases} \qquad (24)$$

The present disclosure provides electronic equipment, including a memory and a processor, where the memory stores a computer program, and the processor implements the steps of the multi-arm spacecraft model predictive control method based on the mixture of Gaussian processes when executing the computer program.

The present disclosure provides a computer-readable storage medium for storing computer instructions, where the steps of the multi-arm spacecraft model predictive control method based on the mixture of Gaussian processes are implemented when the computer instructions are executed by the processor.

The multi-arm spacecraft model predictive control method based on the mixture of Gaussian processes, the equipment, and the medium which are proposed by the present disclosure have been described above in detail. Specific examples are used herein to illustrate the principle and implementation of the present disclosure. The description of the above examples is only used to help understand the method and its core idea of the present disclosure. Furthermore, for those skilled in the art, according to the idea of the present disclosure, there may be changes in the specific examples and the scope of application. To sum up, the content of the Description should not be construed as limiting the present disclosure.

The invention claimed is:

1. A multi-arm spacecraft model predictive control method based on a mixture of Gaussian processes, comprising:

establishing dynamic and kinematic models of a multi-arm spacecraft as a prediction model in model predictive control (MPC);

for an estimated value $\hat{d}$ of a disturbance term in the prediction model, inputting initial excitation to establish a data set, and employing the mixture of Gaussian processes for training to obtain residual dynamics of the multi-arm spacecraft as the estimated value of the disturbance term;

constructing, according to actual drive input saturation constraints, a model predictive controller to implement tracking of a desired trajectory by end-effectors poses of spacecraft manipulators and a platform pose, wherein the saturation comprises saturation of joint motors and thrust saturation of platform thrusters; and setting the platform thrusters to be in an on-off control mode, and assigning a platform continuous control instruction generated by the MPC as start-up time of each of the thrusters to obtain a final thruster driving instruction.

2. The method according to claim 1, wherein for a multi-arm spacecraft with n manipulators, each of which has m degrees of freedom, and with a platform equipped with/jet thrusters, the dynamic model of the multi-arm spacecraft is first described in a joint space:

the dynamic model of the multi-arm spacecraft is expressed as:

$$M\ddot{Q}+C+d=u \tag{1}$$

where M represents an inertial parameter of the multi-arm spacecraft; C represents a nonlinear term; d is the disturbance term; $Q=[r_0^T, q^T]^T$ represents information about the platform pose and joint angle, ro is a 6-degree-of-freedom platform pose, and $q=[q_1, \ldots, q_n]'$ is the joint angle; and $u=[F_0^T, F_q^T]^T$ represents a control force and a control torque, $F_0$ represents a platform control force/torque, and $F_q$ represents a joint torque.

3. The method according to claim 2, wherein based on a mapping relationship between the end-effectors of the manipulators and states of joints and a platform, a description form of the end-effectors poses of the multi-arm spacecraft manipulators is obtained by using a DH parameter method:

$$\begin{bmatrix} r_0 \\ r_{e1} \\ \vdots \\ r_{en} \end{bmatrix} = \begin{bmatrix} r_0 \\ {}^1T_0^1{}^1T_1^2\ldots{}^1T_{m-1}^m \\ \vdots \\ {}^nT_0^1{}^nT_1^2\ldots{}^nT_{m-1}^m \end{bmatrix} = g(Q), \tag{2}$$

where a homogeneous transformation matrix ${}^nT_{m-1}^m$ is defined based on DH parameters $\theta_m, d_m, a_m, \alpha_m$:

$$^nT_{m-1}^m = \begin{bmatrix} \cos\theta_m & -\sin\theta_m & 0 & a_m \\ \sin\theta_m\cos\alpha_m & \cos\theta_m\cos\alpha_m & -\sin\alpha_m & -d_i\sin\alpha_m \\ \sin\theta_m\sin\alpha_m & \cos\theta_m\sin\alpha_m & \cos\alpha_m & d_i\cos\alpha_m \\ 0 & 0 & 0 & 1 \end{bmatrix}, \tag{3}$$

finally, a state space expression is built:

$$\begin{cases} \dot{X} = f(X,u) = \begin{bmatrix} \dot{Q} \\ M^{-1}(\tau - C - \hat{d}) \end{bmatrix}, \\ \xi = g(Q) \end{cases} \tag{4}$$

where $X=[Q^T, \dot{Q}^T]^T, \xi=[r_0^T, r_{e1}^T, \ldots, r_{en}^T]^T$ represents the platform pose and the end-effectors poses of the manipulators, and $\hat{d}$ represents the estimated value of the disturbance term; and sampling time $\Delta t$ is set, continuous state space expression is converted into a discrete time model, and a system state at a future moment k+N is predicted based on a value measured at a current moment k:

$$\begin{cases} X_{k+1} = X_k + \Delta t \cdot f(X_k, u_k) \\ \xi = g(Q_k) \end{cases}. \tag{5}$$

4. The method according to claim 3, wherein recorded p groups of data sets are used for training of the mixture of Gaussian processes, wherein an input x contains the multi-arm spacecraft pose Q, speed $\dot{Q}$, and an increment $\Delta u$ of a control variable, and an output y is a difference value between an actual angular velocity and an angular acceleration calculated by a nominal model, that is, the residual dynamics, which is used to capture the impact $\hat{d}$ of a total disturbance on the system;

the Gaussian processes assume in advance that samples obey a Gaussian distribution:

$$y(x) \sim N(\mu(x), k(x,x')) \tag{6}$$

where $\mu(x)$ represents a mean function; $k(x,x')$ represents a covariance function, and an expression thereof is as follows:

$$k(x,x') = \sigma_f^2 \exp\left[\frac{-(x-x')^2}{2l^2}\right] + \sigma_n^2 \delta(x-x'), \tag{7}$$

where $\sigma_n$ is equal to 0.3, $\sigma_f$ and l are hyperparameters to be solved, and $$\delta(x-x') = \begin{cases} 1, & x = x' \\ 0, & x \neq x' \end{cases};$$

the covariance function is solved by using an optimal maximum likelihood estimation method:

$$\max_{\sigma_f, l} \log(y|x) = -\frac{1}{2}y^T K^{-1} y - \frac{1}{2}\log|K| - \frac{n}{2}\log(2\pi), \tag{8}$$

after the hyperparameters of the Gaussian processes are obtained via training, the corresponding output value $y_*$ can be solved by using input information $x_*$ of a prediction point; a joint probability density function of the samples and a test set is firstly determined:

$$\begin{bmatrix} y(x) \\ y_* \end{bmatrix} \sim N\left(\theta, \begin{bmatrix} K & K_*^T \\ K_* & K_{**} \end{bmatrix}\right), \text{where} \tag{9}$$

$$K_{**} = k(x_*, x_*) \tag{10}$$

$$K_* = [k(x_*, x_1) \quad k(x_*, x_2) \quad k(x_*, x_p)] \tag{11}$$

$$K = \begin{bmatrix} k(x_1, x_1) & k(x_1, x_2) & \cdots & k(x_1, x_p) \\ k(x_2, x_1) & k(x_2, x_2) & \cdots & k(x_2, x_p) \\ \vdots & \vdots & \ddots & \vdots \\ k(x_p, x_1) & k(x_p, x_2) & \cdots & k(x_p, x_p) \end{bmatrix}, \tag{12}$$

a posterior probability expression of the prediction point is obtained based on Bayesian reasoning:

$$y_* | y(x) \sim N(K_* K^{-1} y, K_{**} - K_* K^{-1} K_*^T) \tag{13}$$

a predicted value of the Gaussian processes is accordingly obtained:

$$\bar{y}_* = K_* K^{-1} y \quad (14).$$

5. The method according to claim 4, wherein a local Gaussian process method is utilized in the Gaussian processes of the multi-arm spacecraft, and the local Gaussian process method comprises: clustering based on a Gaussian mixture model method, performing regression on each of Gaussian components, and finally fusing local predicted values during prediction;

assuming that the input x obeys mixture distribution of M Gaussian components, a probability density distribution function of the input x is as follows:

$$p(x \mid \Theta) = \sum_{i=1}^{M} \pi_i p(x \mid \mu_i, \Sigma_i) \quad (15)$$

where $\pi$ is a mixing coefficient, which represents the probability that the sample comes from the $i^{th}$ Gaussian component; $p(x\mid\mu_i, \Sigma_i)$ represents the probability that the sample is generated by the $i^{th}$ Gaussian component; and $\{\mu_i, \Sigma_i\}$ is the hyperparameter of the mixture of Gaussian processes.

6. The method according to claim 5, wherein after the training samples are obtained, model parameters are first initialized, and then the model parameters are updated by means of continuous iteration of steps E and M of expectation-maximization until the model converges;

wherein step E uses parameters $\{\pi_i, \mu_i, \Sigma_i\}$ estimated in step M to calculate a posterior probability $r_i$ of the sample coming from the $i^{th}$ Gaussian component:

$$r_i = \frac{\pi_i p(x \mid \mu_i, \Sigma_i)}{\sum_{j=1}^{M} \pi_j p(x \mid \mu_j, \Sigma_j)}, \quad (16)$$

in step M, the posterior probability $r_i$ of the training samples is calculated through step E, and the model parameters are updated by maximizing a logarithmic likelihood function:

$$\begin{cases} \mu_i = \sum_{k=1}^{n} r_k x_k \Big/ \sum_{k=1}^{n} r_k \\ \Sigma_i = \sum_{k=1}^{n} r_k (x_k - \mu_i)(x_k - \mu_i)^T \Big/ \sum_{k=1}^{n} r_k, \\ \pi_i = \frac{1}{n} \sum_{k=1}^{n} r_k \end{cases} \quad (17)$$

for each group of Gaussian components obtained by clustering, a Gaussian regression training method is used to obtain the corresponding Gaussian process models and the predicted value $y_*$ of the prediction point $x_*$ under the M local Gaussian process models, and the prediction point generated by the clustering is subjected to weighted fusion by the posterior probability $r_{*i}$ generated by the $i^{th}$ Gaussian component so as to calculate the final predicted value $y_*$:

$$y_* = \sum_{i=1}^{M} r_{*i} y_{*i}. \quad (18)$$

7. The method according to claim 6, wherein a performance index in the following form is constructed to solve the control input of the system:

$$\min_u J = \frac{1}{2} \sum_{i=1}^{N} |\xi_{k+i} - \xi_{k+i}^d|_{Q_t}^2 + \|u_{k+i-1}\|_{Q_r}^2 \quad (19)$$

$$\text{s.t. } X_{k+1} = X_k + \Delta t \cdot f(X_k, u_k)$$

$$\xi_k = g(Q_k)$$

$$X_{min} < X_k < X_{max}$$

$$\xi_{min} < \xi_k < \xi_{max}$$

$$u_{min} < u_k < u_{max},$$

where $Q_r$ and $Q_t$ represent weighting matrices of a control error and an input penalty term, respectively; and by selecting appropriate controller parameters which comprise $\Delta t$, N, $Q_r$ and $Q_t$, the above optimization control problem is solved, the control variable U= $[U_k, U_{k+1}, \ldots, U_{k+N-1}]^T$ at the next N moments is obtained, and only the control variable $u_k$ at the moment k is used as the system input.

8. The method according to claim 7, wherein a generalized thruster installation matrix is given first, that is, there are l jet thrusters installed on the satellite platform, wherein the installation position of each of the thrusters is divided into $[X_{Ti}, Y_{Ti}, Z_{Ti}]^T$, and the included angles between thrust vectoring and a +x direction and between the thrust vectoring and a x-y plane are respectively $\beta_i$ and $\gamma_i$, so that a configuration matrix of a thruster thrust and a torque under the satellite platform system is obtained:

$$A(:,i) = \begin{bmatrix} \cos\gamma_i \cos\beta_i \\ \cos\gamma_i \sin\beta_i \\ \sin\gamma_i \\ \cos\gamma_i \sin\beta_i \cdot z_{Ti} - \sin\gamma_i \cdot y_{Ti} \\ \sin\gamma_i \cdot z_{Ti} - \cos\gamma_i \cos\beta_i \cdot z_{Ti} \\ \cos\gamma_i \cos\beta_i \cdot y_{Ti} - \cos\gamma_i \sin\beta_i \cdot x_{Ti} \end{bmatrix}, \quad (20)$$

thus, a relationship between the platform control force and the control torque as well as thrust of the jet thrusters is obtained:

$$F_0 = C_{IB} A T \quad (21)$$

where $C_{IB}$ is a conversion matrix from the platform system to an inertial system, and $T=[T_1, T_2, \ldots, T_l]^T$ is the thrust of the jet thrusters;

for the obtained platform control variable $F_0$, a thrust distribution algorithm is designed by constructing the following optimization problems, and the control variable is allocated to each of the thrusters:

$$\min_T J = \frac{1}{2} \left[ \|C_{IB} AT - \tau\|_{Qt}^2 + \|T\|_{Rf}^2 \right] \quad (22)$$

$$\text{s.t. } T_{lb} \le T \le T_{ub},$$

where $T_{ib}$ and $T_{ub}$ represent thrust saturation constraints for the thrusters;

the continuous thrust of each of the thrusters is obtained by thrust distribution; in order to meet the on-off control mode of the thrusters, the continuous thrust is converted into the start-up time in an on-off mode through a PWM method:

$$t_{on}^i = \frac{T_i^*}{T_i^o} \Delta t, \tag{23}$$

where $T^*_i$ represents the continuous thrust obtained by the distribution algorithm, $T_i^o$ represents the start-up thrust of the thrusters, and $\Delta t$ represents a PWM frequency; and finally, minimum start-up time $\Delta t_c$ of the thrusters is taken into account, and the final thruster driving instruction is obtained:

$$T_{on}^i = \begin{cases} 1, & \text{if } 0 \leq t \leq t_{on}^i \text{ and } t_{on}^i \geq \Delta t_c \\ 0, & \text{otherwise} \end{cases} \tag{24}$$

9. Electronic equipment, comprising a memory and a processor, wherein the memory stores a computer program, and the processor implements the steps of the method according to claim 1 when executing the computer program.

10. A non-transitory computer-readable storage medium for storing computer instructions, wherein the steps of the method according to claim 1 are implemented when the computer instructions are executed by the processor.

* * * * *